United States Patent [19]
Magnusson et al.

[11] Patent Number: 5,273,649
[45] Date of Patent: Dec. 28, 1993

[54] PERSONAL WATER PURIFICATION SYSTEMS

[76] Inventors: Jan H. Magnusson; Kristofer J. Magnusson, both of 117 Wild Wood Beach Rd., Mahtomedi, Minn. 55115

[21] Appl. No.: 772,098

[22] Filed: Oct. 7, 1991

[51] Int. Cl.$^5$ .............................................. B01D 27/02
[52] U.S. Cl. .................................. 210/232; 210/264; 210/282
[58] Field of Search ............... 210/232, 263, 264, 266, 210/282, 283

[56] References Cited

U.S. PATENT DOCUMENTS

| | | | |
|---|---|---|---|
| 3,342,340 | 9/1967 | Shindell | 210/283 |
| 4,298,475 | 11/1981 | Gartner | 210/266 |
| 4,382,862 | 5/1983 | Dillman | 210/282 |
| 4,443,336 | 4/1984 | Bennethun | 210/282 |
| 4,529,511 | 7/1985 | Breeden et al. | 210/282 |
| 4,605,499 | 8/1986 | Wise | 210/282 |
| 4,714,550 | 12/1987 | Nalson et al. | 210/282 |
| 4,798,671 | 1/1989 | Mijers et al. | 210/282 |
| 4,826,594 | 5/1989 | Sedman | 210/283 |
| 4,995,976 | 2/1991 | Vernes et al. | 210/282 |
| 5,045,195 | 9/1991 | Spangrud et al. | 210/282 |
| 5,122,272 | 6/1992 | Iana et al. | 210/282 |
| 5,128,036 | 7/1992 | Suersson | 210/264 |

Primary Examiner—Robert A. Dawson
Assistant Examiner—W. L. Millard
Attorney, Agent, or Firm—Douglas L. Tschida

[57] ABSTRACT

Low volume, personal water purification systems including cartridges containing multi-valent iodine resins, granulated active carbons, and porous separation and filtration means. In one assembly, a first section of a multi-sectioned cartridge includes an inlet, a mouthpiece and a coupler. A second section includes mating coupling means and each section includes separate filtration and/or purification media. In other assemblies, cartridges of a variety of filtration/purification organizations mount within squeezable, vented housings including straws or self-sealing outlet ports. In still other assemblies, the cartridges couple to a manifold housing.

29 Claims, 10 Drawing Sheets

PERSONAL WATER PURIFICATION SYSTEMS

BACKGROUND OF THE INVENTION

The present invention relates to potable water supply systems, and in particular, to modular, transportable personal systems for use in recreational, military and household applications.

A logistical concern of backpackers, hunters and those generally involved in the outdoors is that of having an available supply of potable water. A further concern is how to transport sufficient quantities between water depots or sources to sustain the affected individuals between re-supply. Such considerations are of special concern to the outfitting of ground troops, especially under conditions where potable water supplies may be scarce to non-existent, even though contaminated water is otherwise available.

Presuming some type of water is available, considerations can be focused on making the available water potable, for example, by way of a variety of filtration, purification, distillation or other known techniques. In these regards, Applicant is aware of U.S. Pat. No. 4,298,475 which discloses a straw like purifier. The purifier includes a granular activated carbon (GAC) filtration section in combination with an iodine resin purification section. A filtered inlet and mouthpiece enable ingestion with the water being purified prior to exiting the straw.

Although effective in practice, usage of the foregoing assembly can be rather strenuous. That is, the user must exert a rather large vacuum or "sucking" action at the straw to overcome the resistance to liquid flow of the intermediate iodine resin and GAC materials. A light-headed condition can result.

Applicants are aware of still another straw-like personal purification device sold by Water Technologies, Inc. of Minneapolis, Minn. and discussed in U.S. Pat. No. 4,995,976. This device includes a removable distal filter and separate iodine resin purification beds or bactericides positioned to either side of a GAC bed. While offering improvements over the prior device, this device too has been found to be physically taxing to the user.

In appreciation of the foregoing shortcomings of prior personal purification systems and assemblies, Applicants have developed a disposable, cartridge based system which finds application in a number of personally transported assemblies. Depending upon the volume of drinking water required by the user, various ones of the assemblies can be selected.

SUMMARY OF THE INVENTION

It is accordingly a primary object of the present invention to provide a disposable, cartridge based water filter/purifier.

It is a further object of the invention to provide a cartridge which accommodates liquid flow at reduced pressures, whether positive or negative.

It is a further object of the invention to provide a multi-section straw-like assembly with disposable sections.

It is a further object of the invention to provide a cartridge which is adaptable for use with pressurizable water storage containers for temporarily storing contaminated water and expelling treated, potable water.

It is a further object of the invention to provide cartridges which are readily mountable within plastic squeeze bottles, intermediate a nozzle or mouthpiece and wherefrom potable water is expressed.

It is a further object of the invention to stabilize the cartridge relative to a large volume container, such as disposable plastic bottles or durable canteens.

It is a still further object of the invention to adapt the cartridges to presently available manifold systems serving the household, water filtration industry.

Various of the foregoing objects, advantages and distinctions of the invention are obtained in one improved straw-like assembly which provides a number of interconnecting tubular sections. At least one section includes a filtered inlet, while another includes a mouthpiece, and intermediate of which a twist, bayonet or other sealed mount coupler means is provided to secure the sections to one another. The coupled sections may variously contain GAC particulate mixtures of varying porosities and/or iodine resins of differing purification properties. Improved throughput is however obtained at reduced pressures. In other cartridge assemblies, the cartridge is adapted to provide couplers for mating with a removable mouthpiece.

A number of pressurizable assemblies are also provided. In some assemblies a squeeze bottle is provided which includes a molded bottle cover that is formed to provide an annular projection or recess for supporting a cartridge in relation to an O'ring and/or snap ring. A nozzle, straw or outlet aligned with the cartridge can thereby express potable water via a gravity action, a sucking action or a squeeze action. An assembly adaptable to a pressurized household water system is also provided which includes a manifold and housing portion adapted to support the present invention.

Still other objects, advantages and distinctions of the invention can be appreciated from the following description with respect to a variety of assemblies that are disclosed in detail in the appended drawings. To the extent various modifications and improvements have been considered, they are described as appropriate. The following description is therefore intended to be illustrative only of considered constructions of the invention and the description should not be interpreted in strict limitation thereto. Rather, the invention should be interpreted within the scope of following appended claims.

DESCRIPTION OF THE PREFERRED EMBODIMENT

Figure 1:
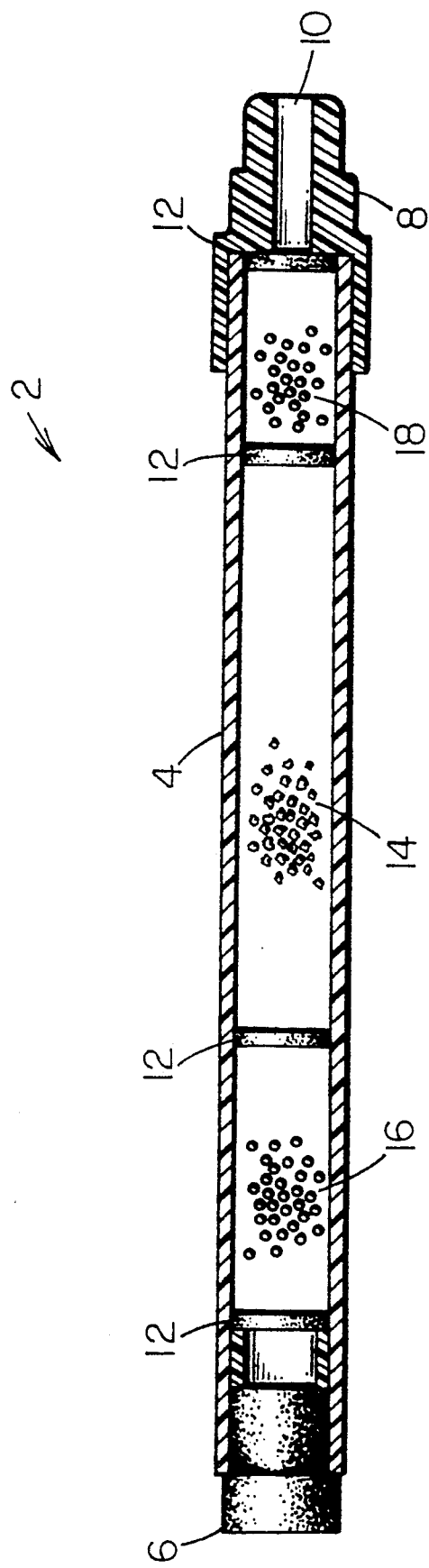
FIG. 1 shows a cross section view through a one-piece prior art survival straw.

Referring to FIG. 1, a longitudinal, cross section view is shown through a prior art, straw-like purification assembly 2 of which Applicants are aware. This assembly generally provides a tubular, hard walled outer housing 4 which terminates at a replaceable foam filter 6 mounted at a distal end and a permanently secured, molded mouthpiece 8 having a bore 10 at a proximal end.

Water is ingested through the housing 4 via a mouth induced sucking action at the mouthpiece 8. As the water traverses the housing 4, sediment is filtered at the filter 6 and a number of porous, high density washers or disk spacers 12, and a bed 14 of granular activated carbon (GAC) or a mixture or GAC and charcoal. Supported between ones of the spacers 12 at the distal end is a quantity of resin beads which are coated or impregnated with a penta-valent iodine material, sometimes referred to as a pentacide or by it tradename penta pure.

Supported at the proximal end or adjacent the mouthpiece 8 of the assembly 2 is an additional quantity of trivalent iodine resin beads or triocide. Whereas the pentacide material is relatively fast acting as it purifies the water of most bacteria, viruses and the like, the triocide material is slower acting, less costly and more efficient as a bactericide for saliva-borne and airborne bacteria, viruses and the like. For convenience only and throughout the drawings, the GAC, pentacide and triocide materials are shown in diagrammatic form as partially filling each chamber. In practice, however, they completely fill the allotted volume within each chamber.

Figure 2:
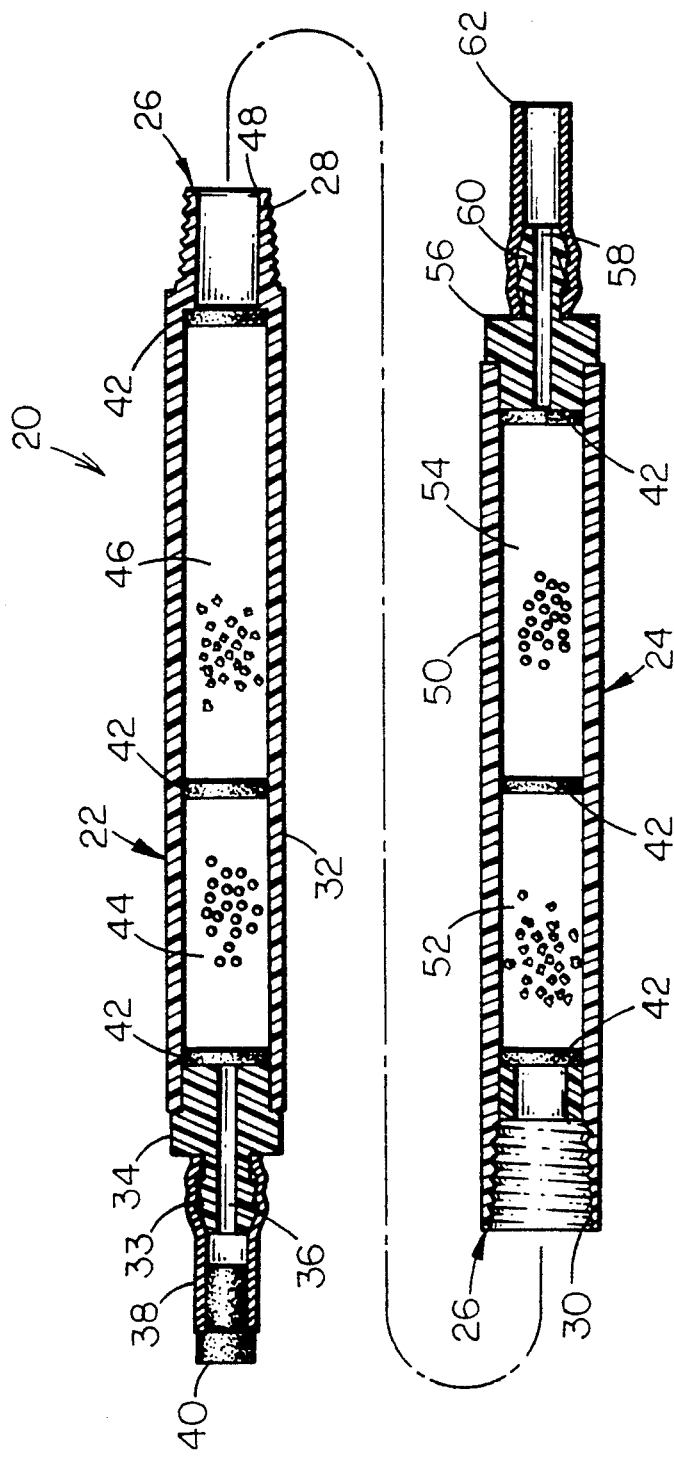
FIG. 2 shows a cross section view through an improved multi-section straw assembly.
Figure 3:
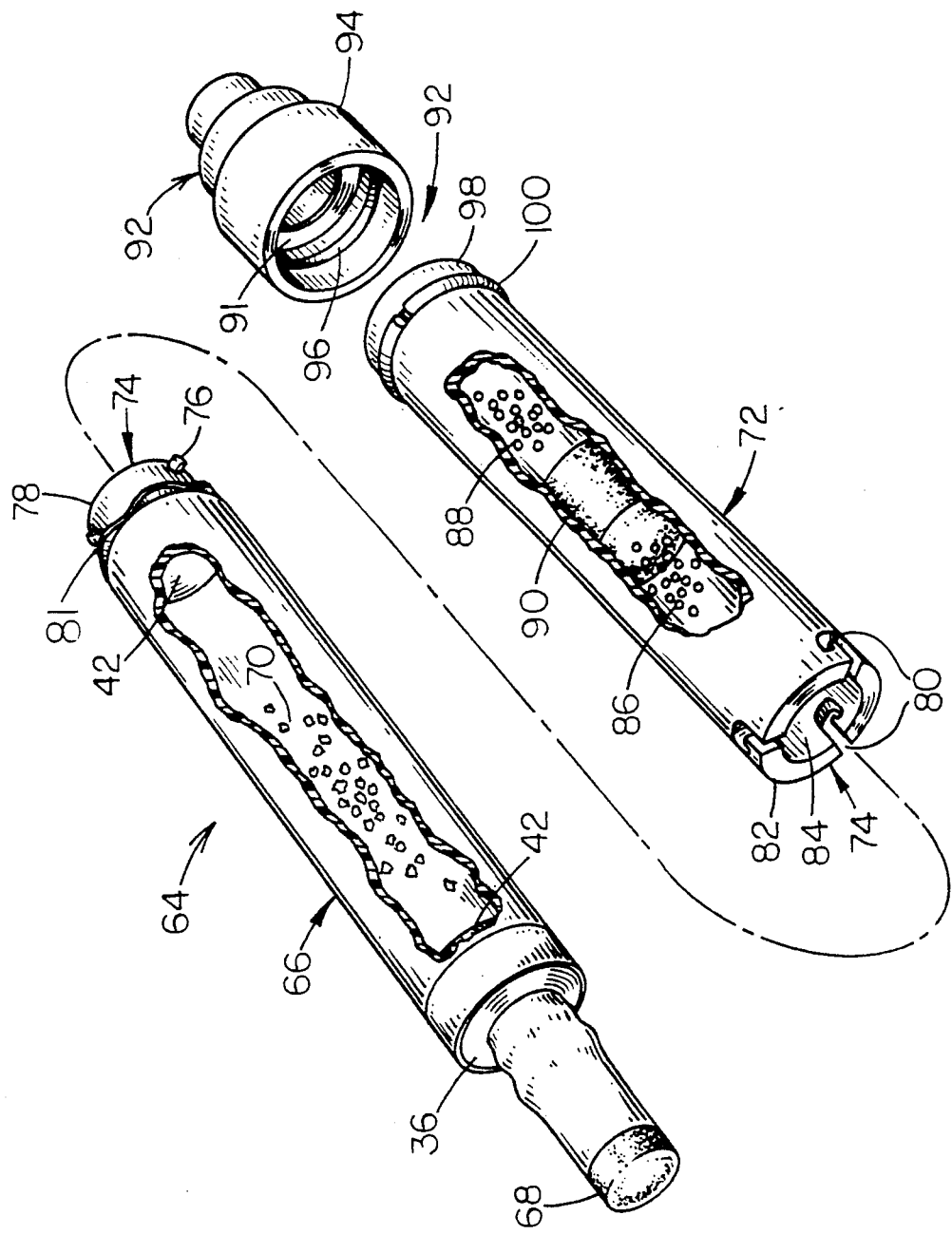
FIG. 3 shows an exploded assembly drawing in partial cutaway of an alternative twist, coupled assembly similar to that of FIG. 2.
Figure 4:
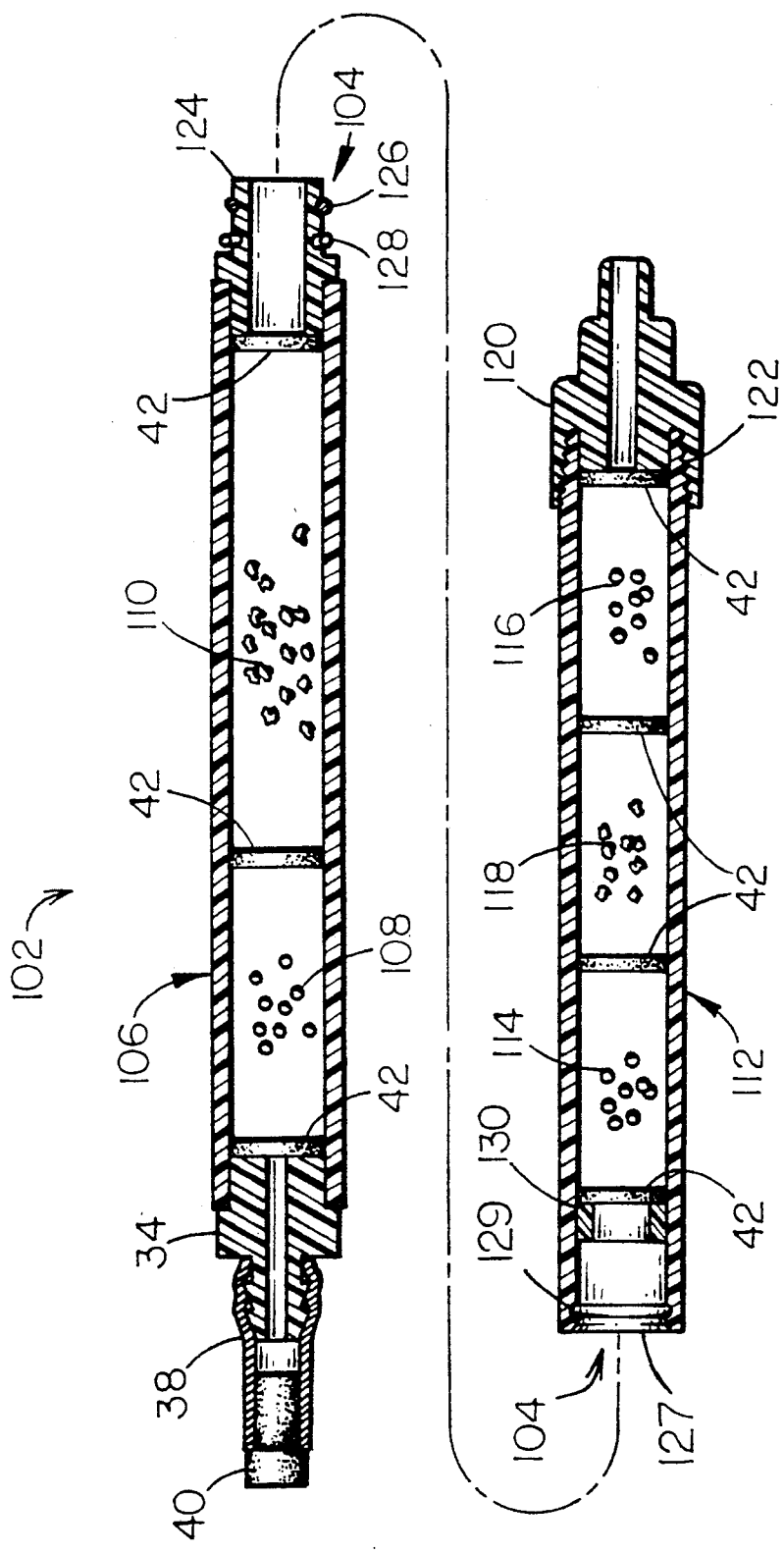
FIG. 4 is a cross section drawing through another multi-section assembly.

Although the assembly of FIG. 1 performs its intended function, in practice, relatively large negative pressures are required to sustain liquid flow. Appreciating that such pressures are developed through a sucking action, the jaw muscles of the user can be strained and/or blood pressure may rise, which can cause lightheadedness. Accordingly, Applicants have sought to develop an improved assembly with sustainable throughput at lower vacuums and/or positive pressures. Constructions depending upon mouth induced vacuum suction are shown at FIGS. 2 through 4. Positively pressurized assemblies which utilize soft-walled containers, which are squeezable to induce positive internal pressures, are shown at FIGS. 5 through 8. Otherwise, FIGS. 9 and 10 disclose positively pressurized household assemblies which are compatible with ones or portions of the purification cartridges shown in FIGS. 2 through 8.

Turning attention to FIG. 2, an improved, multi-section, straw-like purifier 20 is shown. This assembly generally provides a section 22 which contacts the water and a mouthpiece section 24 which contacts the user's mouth. The sections 22, 24 detach from one another via a mating coupler assembly 26 which is positioned approximately midway along the assembly 20. Threaded couplers 28, 30 are particularly shown, which are integrally formed with the housings of the sections 22, 24. Alternatively, detachable threaded couplers might be used. The sections 22, 24 may also exhibit different lengths and diameters or be the same. In the latter case, any unused interior space may be occupied with a filler.

The section 22 particularly provides a tubular, hard walled housing 32. The housing 32 may be made of plastic or any other durable material, provided the walls don't collapse under normally encountered conditions. Secured to the distal end is a tubular coupler 34 having a through bore 36. The coupler 34 is adhesively bonded to the housing 32, although may be secured by sonic welding and other known fasteners. Ridged surface projections 33 are provided on the protruding external surface of the coupler 34 for receiving and containing an adjustable length of flexible, plastic tube stock 38 or the like thereto. Mounted to the distal end of the tube 38 is a replaceable filter 40. Presently, the foam filter 40 comprises a relatively open celled media.

Mounted within the interior of the housing 32 and separated from one another via a plurality of porous spacers 42 are suitable volumes of bactericide and filter media. The dimensions and porosity of the spacers 42 may be varied to enhance liquid throughput at lower pressures. Presently, they are constructed from a porous plastic filter media having a pore size in range of 100 to 200 microns and exhibit a diameter equivalent to that of the housing interior. The spacers may be constructed from plastic, ceramic, foam, screen or a variety of other porous materials.

Positioned adjacent the coupler 34 and adjacent spacer 42 is a volume of pentacide 44. For a housing having an internal bore diameter of approximately three-fourths of an inch, the pentacide is deposited to an approximate bed depth in the range of $\frac{3}{4}$ to $1\frac{1}{4}$ inches. This material is very fast acting and has proven effective for purifying water of most commonly encountered bacterial, viral and other contaminants.

Proximal of the pentacide 44 is a filtrate of granular activated carbon (GAC) media 46. This material may comprise a mixture of carbon and charcoal of different grain sizes, although an industry graded 8-32 material is presently used. Preferably, the GAC filtrate media 46 provides relatively large nominal dimensions. Greater porosity or space between particles is thereby obtained, while still permitting sufficient contact time between the water and bactericide. The GAC media 46 is provided to an approximate bed depth in the range of $2\frac{1}{2}$ to $3\frac{1}{2}$ inches which removes any iodine taste and filters suspended contaminants that may pass through the foam filter 40. A concentration ratio in the range of 3 parts filtrate 46 to approximately one part pentacide 44 is preferred.

Formed at the aft end of the section 22 is a male, threaded coupler 28 having a through bore 48. The diameter of the coupler bore 48 is preferably made as large as possible to facilitate liquid throughput.

The mouthpiece containing cartridge section 24, otherwise, includes a hard walled tubular housing 50 which is constructed of a material similar to that of the housing 32. A female coupler portion 30 includes mating threads to the coupler 28 and is bonded to the distal end of the housing 50. Suitable spacers 42 are disposed along the interior of the housing 50 to separate a second filtration bed 52 of GAC media from a second bed of bactericide 54. The filtration bed 52 particularly comprises a 20-50 GAC media which is deposited to a shallower depth than the first GAC bed 46 or approximately two inches. Appreciating that most contaminants are filtered at the cartridge section 22, a finer porosity filtrate is desired, but which still does not restrict liquid throughput or require excessive vacuum.

Proximal to the second filtration bed 52 is a second bed of bactericide 54 which is deposited to a depth in the range of ⅛ to ¾ inches. A triocide material is used. This material is generally slower acting that the pentacide bactericide 44, but is more effective with respect to saliva-borne or airborne bacteria which might enter the housing from the mouthpiece.

Secured to the housing 50 at the proximal end is a mouthpiece coupler 56 having a through bore 58. The coupler is adhesively bonded or welded to the housing 50 and includes a portion exhibiting suitable ridged protrusions 60 for containing a tubular mouthpiece 62 thereto. As depicted, a straw-like tubular, pliable mouthpiece 62 is shown. Alternatively, the mouthpiece 62 can be configured as a molded unitary construction, similar to that of the prior art. For the construction of FIG. 2, the mouthpiece 62 can be cut to a preferred length. It provides a removable mounting. Such a mounting also permits the adaptation of the present cartridge to differing circumstances, which will become more apparent hereinafter.

As mentioned and during normal use, the assembly 20 of FIG. 2 provides for greater liquid throughput with less suction or pressure requirements over the prior art. This is achieved through the use of filtration materials of varying porosities which are disposed apart from one another over the length of a nominally longer assembly 20. This assembly 20 has a nominal filtration/purification life of 150 gallons.

The assembly 20 is configured to distribute the filtration and bactericide over each of the sections 22, 24 of the assembly. Such an arrangement finds advantage if and/or when the respective filtration and purification beds 46, 52 and 44, 24 become plugged or obstructed, the spent cartridge section 22 or 24 can then be separately replaced. The life of the assembly 20 can thus be extended and/or adapted to anticipated conditions and all within a compact, lightweight, personally transportable assembly.

FIGS. 3 and 4 depict alternative multi-sectional assemblies which accommodate some of these latter considerations. FIG. 3 particularly discloses a perspective drawing of a two-piece assembly 64 wherein the water contacting, cartridge section 66 is primarily intended to purify the ingested liquid. The section 66 includes a removeable forward filter 68, but otherwise the he housing interior is substantially filled with a pentacide media 70. End spacers 42 separate the pentacide 70 within the section 66. The length of the section 66 is approximately three inches, which is shorter than the aft general purpose section 72. The section 66 may alternatively be configured as a filter section and be substantially filled with a filtrate, such as a GAC media. A short proximal bed of pentacide must, however, still be included to prevent contamination of the filtrate.

The purification section 66 is coupled to the general purpose section 72 via a twist locking, bayonet-type slip coupler assembly 74. A number of projections 76 extend from a coupler end 78 bonded to the cartridge section 66 and mate with slots 80 formed in a coupler end 82 at a purifier cartridge section 72. Upon slip coupling the sections 66, 72 to one another and with the seating of the projections 76 at the aft end of the slots 80, the sections are rotated to secure one to the other. A pliable O'ring seal (not shown) can be used to seal the joint and a spring washer 81 maintains tension at the joint.

Although a twist lock action is provided, it is to be appreciated that other forms of locking action can be obtained. For example and as shown at FIG. 4, a pair of slide coupler sections 124 provide an O'ring seal 126 and a snap ring 128 which cooperate to seal and retain the cartridge sections to one another. The details of this assembly will be described below.

Otherwise, the general purpose section 72 contains another proximal bed 86 of pentacide and aft of which is positioned a foam filter 90. A bed of triocide 86 is provided before the mouthpiece, which is molded as a removable assembly 92. A mouth contacting portion 94 includes an annular recess 96 and slip couples to an end portion 98 of the housing 72 which supports a snap ring retainer 100.

FIG. 4 discloses a cross-section drawing of an assembly 102 which provides an O'ring containing coupler assembly 104. A water contacting cartridge section 106 is filled with a pentacide bed 108 to partially purify the water and a proximal bed 110 of GAC media to filter suspended particulates. A mouthpiece containing section 112, in turn, includes respective pentacide and triocide purification beds 114, 116 which are disposed on opposite sides of a bed of GAC media 118 and intervening spacers 42. A replaceable mouthpiece 120 is otherwise secured to the cartridge section 112 via a threaded coupling 122. Instead of using a separately attached threaded coupler, the end of the housing section 114 is formed to include threads which mate with threads formed into the mouthpiece 120.

The coupler assembly 104, otherwise, comprises a slip connector 124 which is bonded to the cartridge section 106. A forward portion supports an O'ring seal 126 and a split, C-shaped snap ring 128 at included annular grooves. The mating end of the cartridge section 112 is shaped to present an end cavity 127 which includes a recess 126 to receive the snap ring 128. The O'ring 129 otherwise compresses against the bore walls. A resilient, end seal or washer 130 is also shown which can be used or not as desired.

Referring next to FIGS. 5 through 8, various pressurizable assemblies 140, 142, 144 and 249 are shown which utilize sectional cartridges akin to those of FIGS. 2 through 4. Although, too, single sections are shown, multiple sections might be used in the following assemblies.

The assemblies of FIGS. 5 through 8 provide organizations wherein a water containment means is included which is pressurizable by way of a squeeze action and/or a sucking action. A positive pressure is thus obtainable via the mechanical compression of the container, which alone or in combination with a sucking action forces the water through the purification/filtration cartridge. The physical exertions of the user are thereby minimized. The container is also useable as a temporary storage device and can be transported by the user.

Figure 5:
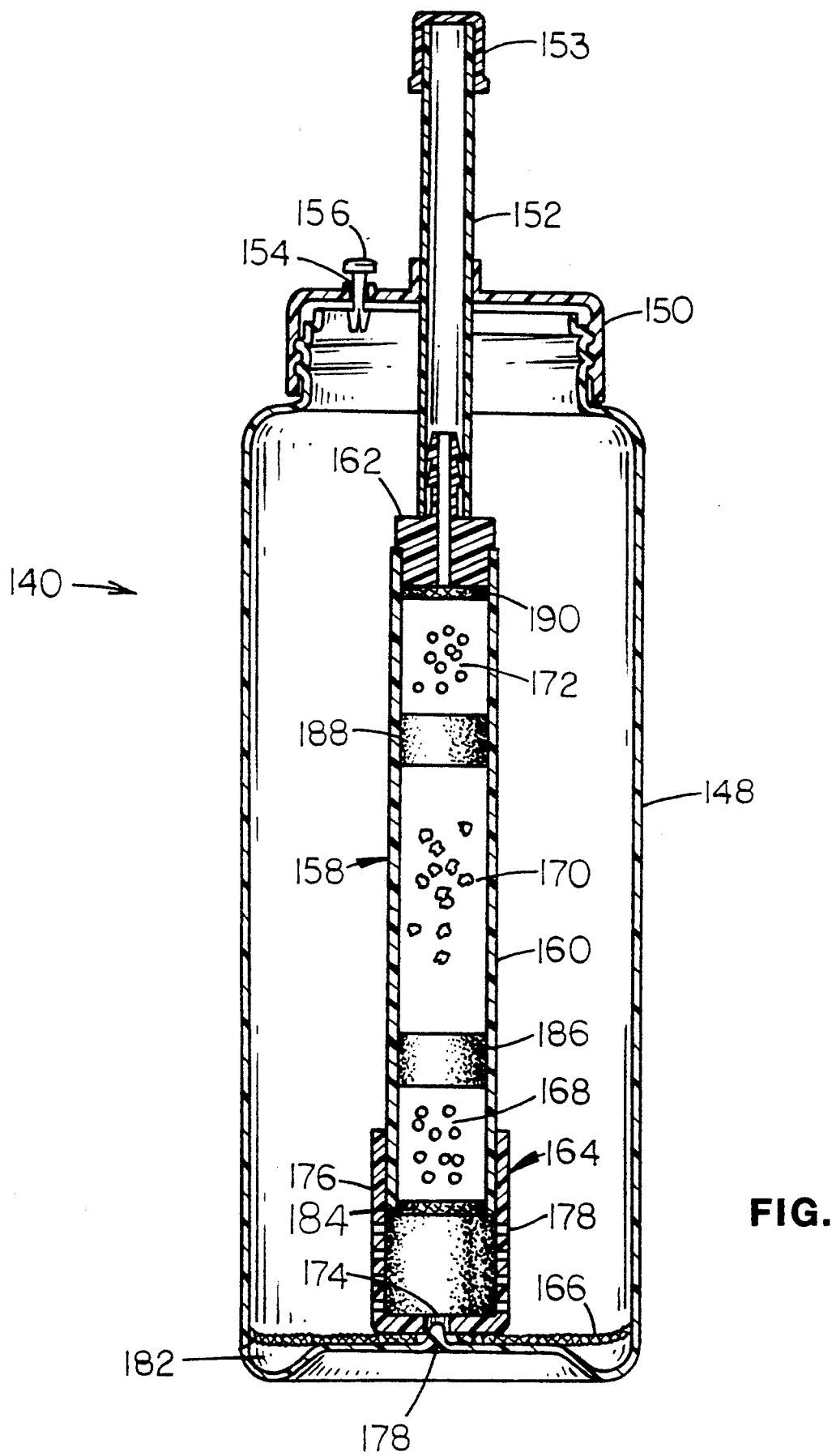
FIG. 5 shows a vented squeeze bottle construction including a cartridge which is stabilized relative to the bottle via a depending, tube supported pre-filter and sedimentation trap.

Referring to FIG. 5, a plastic thin walled container 148 is shown which exhibits a so-called "sport bottle" configuration. The container 148 is typically fabricated to contain twenty to thirty-two ounces of liquid. A molded end cover or cap 150 is threadably secured to an upper end of the container and through which a straw 152 extends. A separate vent port 154 and sliding pegged stake or vent seal 156 is provided to one side of the straw. The interior of the container can thereby be vented or not, as desired.

The container 148 is typically constructed from a pliable plastic material to a nominal wall thickness which permits flexing, yet accommodates the typically anticipated stresses and abuses. Upon flexing the walls with the vent stake 156 closed, the interior of the container 148 can be pressurized to facilitate ejection of liquid from the straw 152. A separate vacuum sucking action can also be imparted by the user to the straw 152. Additional vacuum is particularly desired as the liquid level is drawn down or as the purification/filtration assembly becomes clogged.

A purification/filtration cartridge subassembly 158 is particularly supported at the bottom of the container 148 and to the straw 152. A cap 153 covers the straw 152 when not being used. A hard walled tubular cartridge housing 160 supports a straw coupler 162 at one end and a pre-filter assembly 164 and radially extending sedimentation trap 166 at the other end. Mounted intermediate the housing ends are beds of pentacide 168, GAC media 170 and either a pentacide or triocide 172.

Secured to the distal end of the housing 160 is a preformed, semi-rigid filter assembly 164. The filter 164 provides a rigid outer shell 176, which includes a plurality of bores 178, and which internally supports a replaceable foam filter 180. An end bore 174 indexes the shell 176 to a dimpled projection 178 which projects from the center of the container bottom. In normal use, the straw tube 152 is cut to a length which permits the indexing of the cartridge 158 to the projection 178. This stabilizes the cartridge 158 and minimizes movement of the cartridge within the bottle 148. The cartridge subassembly 158 need not nowever be restrained to the bottom of the bottle.

Appreciating that the available water can contain large volumes of suspended particulates, the container 148, once filled, can be allowed to set for a period of time. During this time, the particulates, can settle out of the water and be partially trapped beneath a flexible, annular meshwork trap 166. The trap 166 mounts between the shell 176 and the bottom of the bottle 148. A void 182 is thereby provided below the trap 166 to collect the settled particles. The trap 166 can be constructed of appropriate screening material to collapse for insertion into the bottle 148, yet expand upon insertion to support the housing in registration with the bottle walls. Where the cartridge 158 is not registered to the bottle 148, the trap 166 can center the cartridge to the bottle.

Contained within the cartridge 158 is a bed of pentacide 168 which is contained between a distal disk screen 184 and a proximal foam filter/spacer 186. A bed of 12-40 or 20-50 GAC media, otherwise, occupies approximately half the volume of the housing 160 and is supported between the foam spacer 186 and a proximal foam spacer 188. A second bed of triocide 172 is contained between the spacer 188, an end screen 190 and the tube coupler 162.

During normal use and after large contaminates have settled out and collected in the void 182, the user sucks contained liquid through the straw 152 which is filtered and purified as it passes through the cartridge 158. As the cartridge becomes partially spent or plugs, positive pressure may be imparted to facilitate flow by squeezing the bottle 160.

Figure 6:
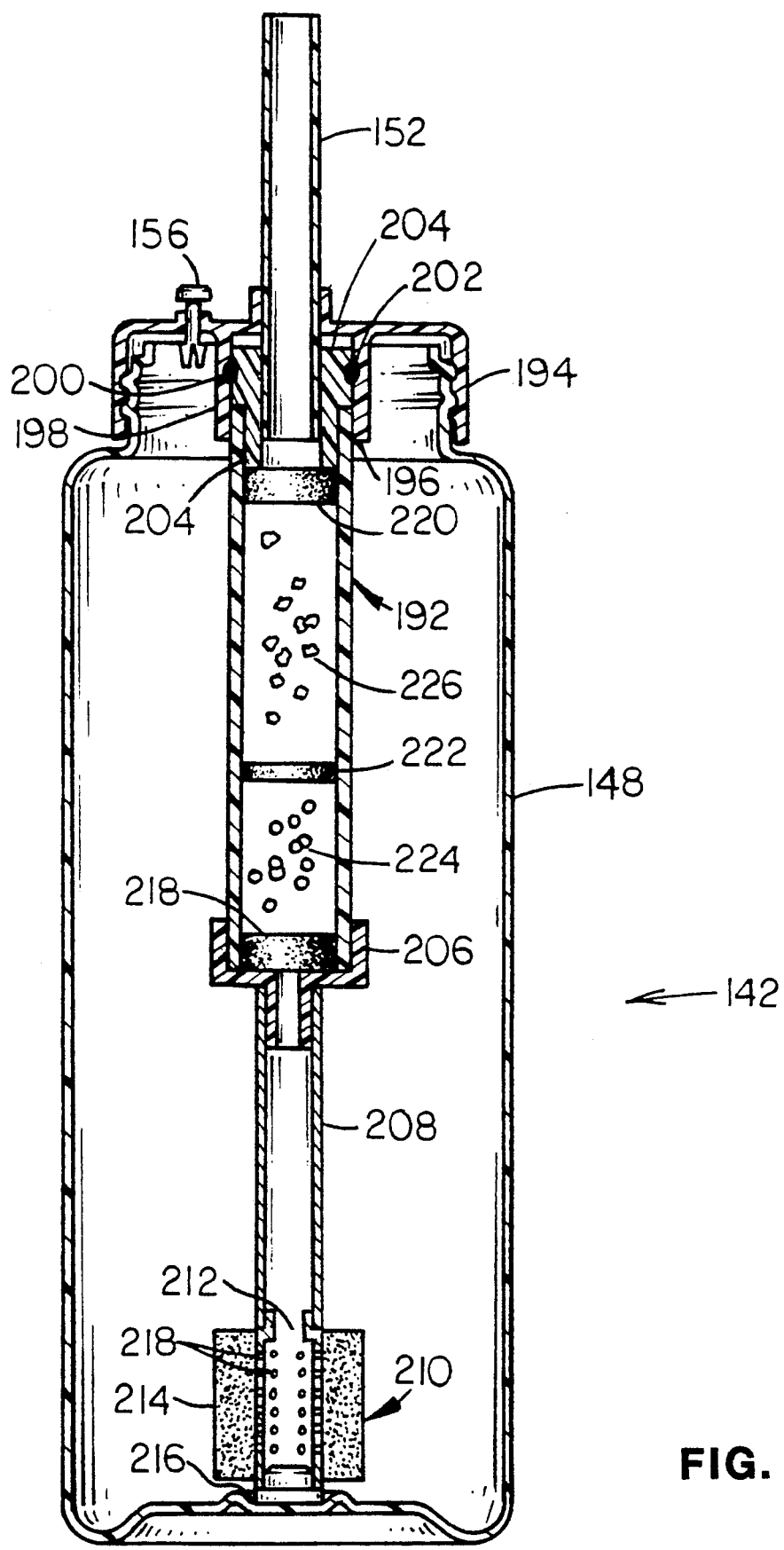
FIG. 6 shows a vented squeeze bottle assembly including a cap supported purification cartridge.

FIG. 6 shows another assembly 142 having similarities to that of FIG. 5. For the assembly 142, the purification/filtration cartridge 192 again mounts within a plastic bottle or container 148. A straw 152 extends from a vented, threaded cap 194 which is molded to provide an annular internal recess or bore 196 and to which the purification/filtration cartridge 192 mounts. The sidewalls 198 of the bore 196 include an annular depression 200 for receiving an O'ring seal or snap ring 202 provided along the end cap 204 of the cartridge 192. Thus, upon inserting the proximal end of the cartridge 192 into the cover 194, the cartridge 192 is restrained in alignment with the straw 152.

The distal end of the cartridge 192 includes a coupler 206, which is bonded to the housing, and from which a length of tubing 208 extends that is sized to fit the housing 148. Supported at the distal end of the tubing 208 is a pre filter assembly 210. The assembly 210 includes a molded core 212 and around which is supported a foam filter 214. An upper end portion of the core 212 is supported within the tube 208, while the lower end of the core 212 is supported at the bottle in alignment with an annular recess 216 in the bottom of the bottle. Ports 218 formed within the core member 212 receive the filtered water.

Water is conveyed through the container 148 via a sucking or negative pressure on the straw 152 and/or a positive pressure induced by squeezing the container 148. The water is purified and filtered as it passes through the pre-filter assembly 210, porous foam spacers 218 and 220, a porous disk 222 and respective beds of pentacide and GAC media 224 and 226.

Figure 7:
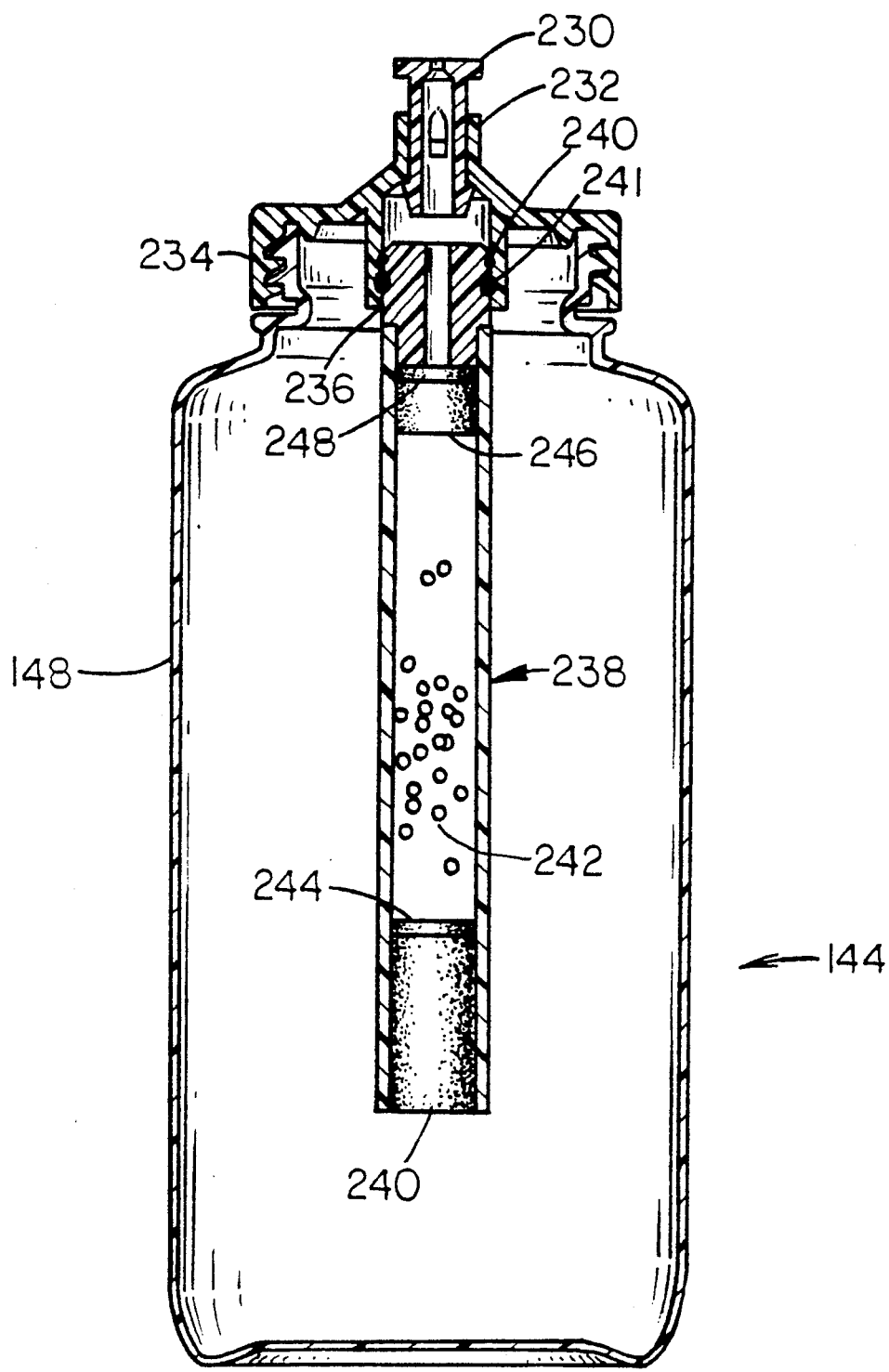
FIG. 7 shows another squeeze bottle configuration including a straw supported cartridge.

FIG. 7 discloses still another "squeeze bottle" assembly 144 which provides a re-closeable "pull cap" 230 at a spout 232 formed into a cover 234. The cap 230 mounts to the spout 232 to alternately define an annular flow space or seal the space when the cap 230 is pressed against the cover.

An annular recess 236 aligned with the spout 232 projects from the cover and supports a purification/filtration cartridge 238. A snap ring 240 and O'ring 241 particularly secure the cartridge 238 to the recess 236. The connection is sufficiently stable that a distal end support assembly is not required.

A foam pre-filter section 240 mounts within the distal end of the cartridge 238 and a bed of pentacide 242 substantially fills the remaining cartridge space, except for a foam spacer 246 and screen spacer 248. The cartridge 238 is principally intended as a purifier and would not normally be used with water containing large amounts of suspended particles. For such conditions, the cartridge 192 could be substituted.

Figure 8:
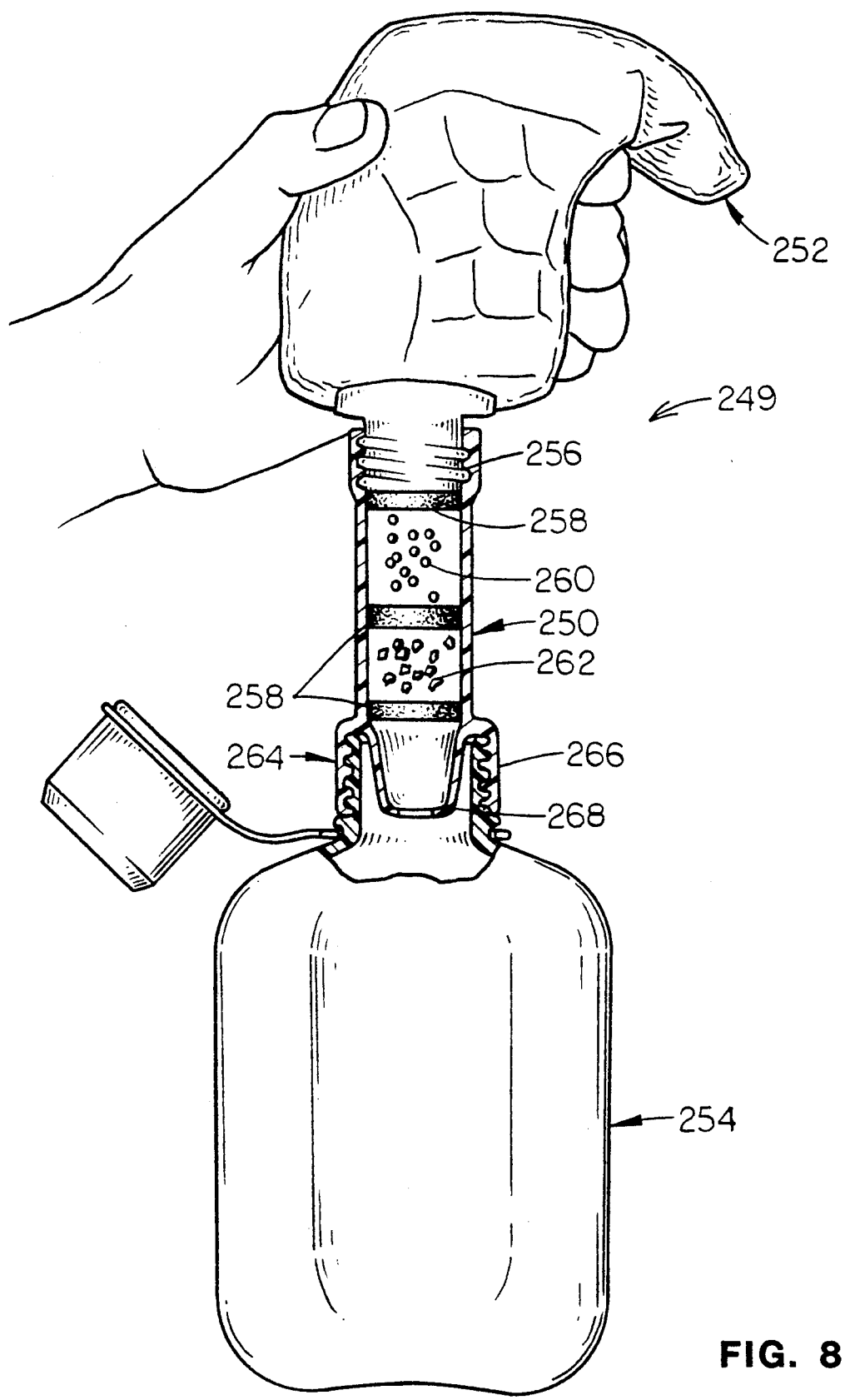
FIG. 8 shows a cartridge purifier adapted for external use with a bag or squeeze bottle.

FIG. 8 discloses still another personal purification/filtration assembly 249. The assembly 249 includes an externally mounted purification/filtration cartridge 250 which mounts intermediate a collection container 252 and a potable water storage container 254. The collection container 252 comprises a transparent collapsible plastic bag. A threaded filling 256 secures the bag to the cartridge 250. Upon squeezing the collection container 252, the contaminated water is expressed under pressure through the cartridge 250 and contained porous spacers 258 and beds of a bactericide 260 and a GAC media 262. A suitably formed nozzle assembly 264 includes a threaded collar 266 which secures the cartridge 250 to the storage container 254. A separate nosepiece 268 extends into the storage container 254.

The assemblies of FIGS. 5 through 8 thus provide a number of alternative assemblies whereby a positive pressure may be applied to the water to facilitate flow through the purification/filtration cartridges 158, 192, 238 and 250. The cartridges may be didicated to purification, filtration or serve both purposes. Such modular configurations accomodate most anticipated circumstances and extend the useful life of the cartridges, which becomes especially desirable where the cartridge may become partially plugged with sediment or where the porosity of the cartridge doesn't readily accommodate a sucking action.

Figure 9:
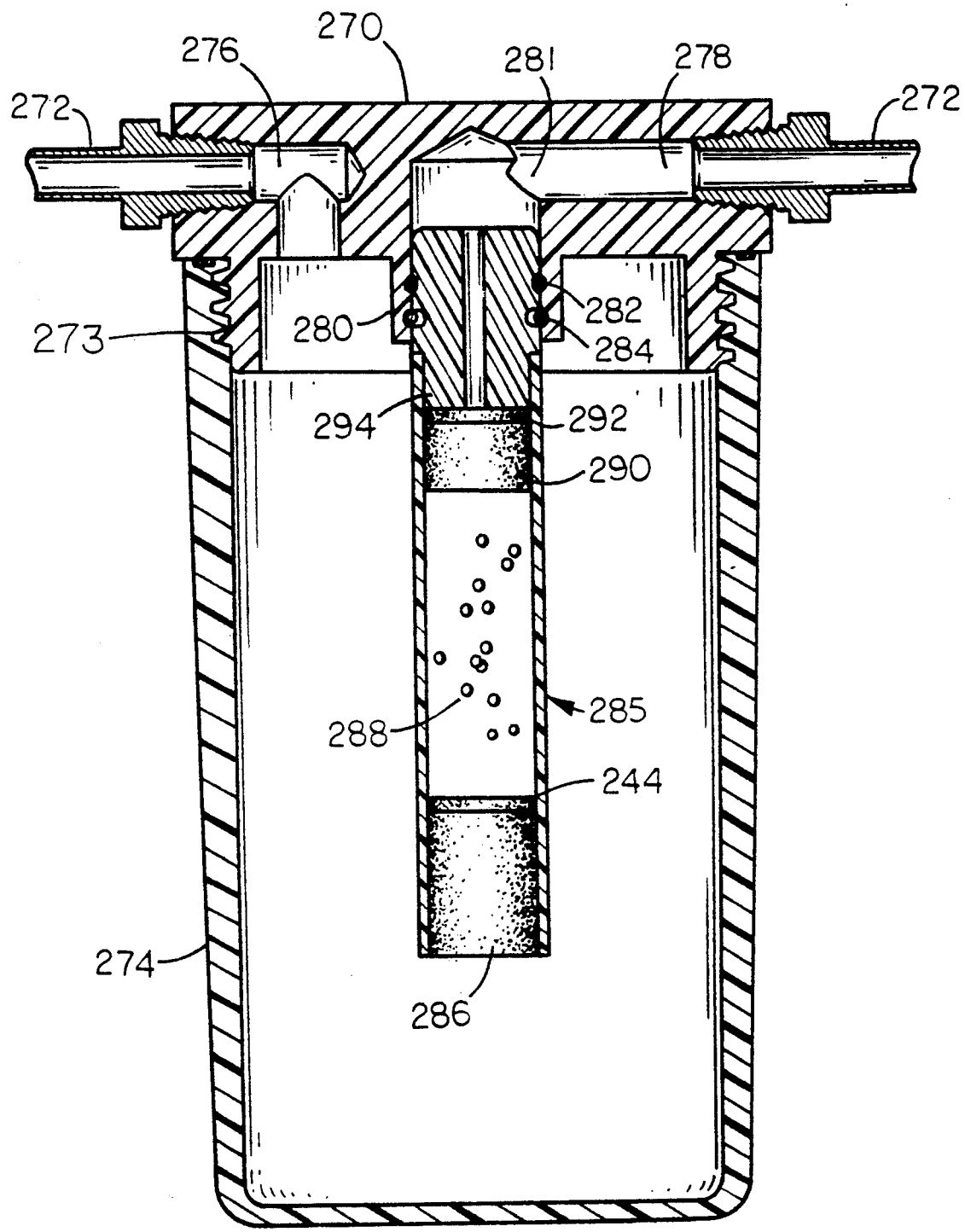
FIG. 9 shows a cross section view through a manifold configured household purifier.
Figure 10:
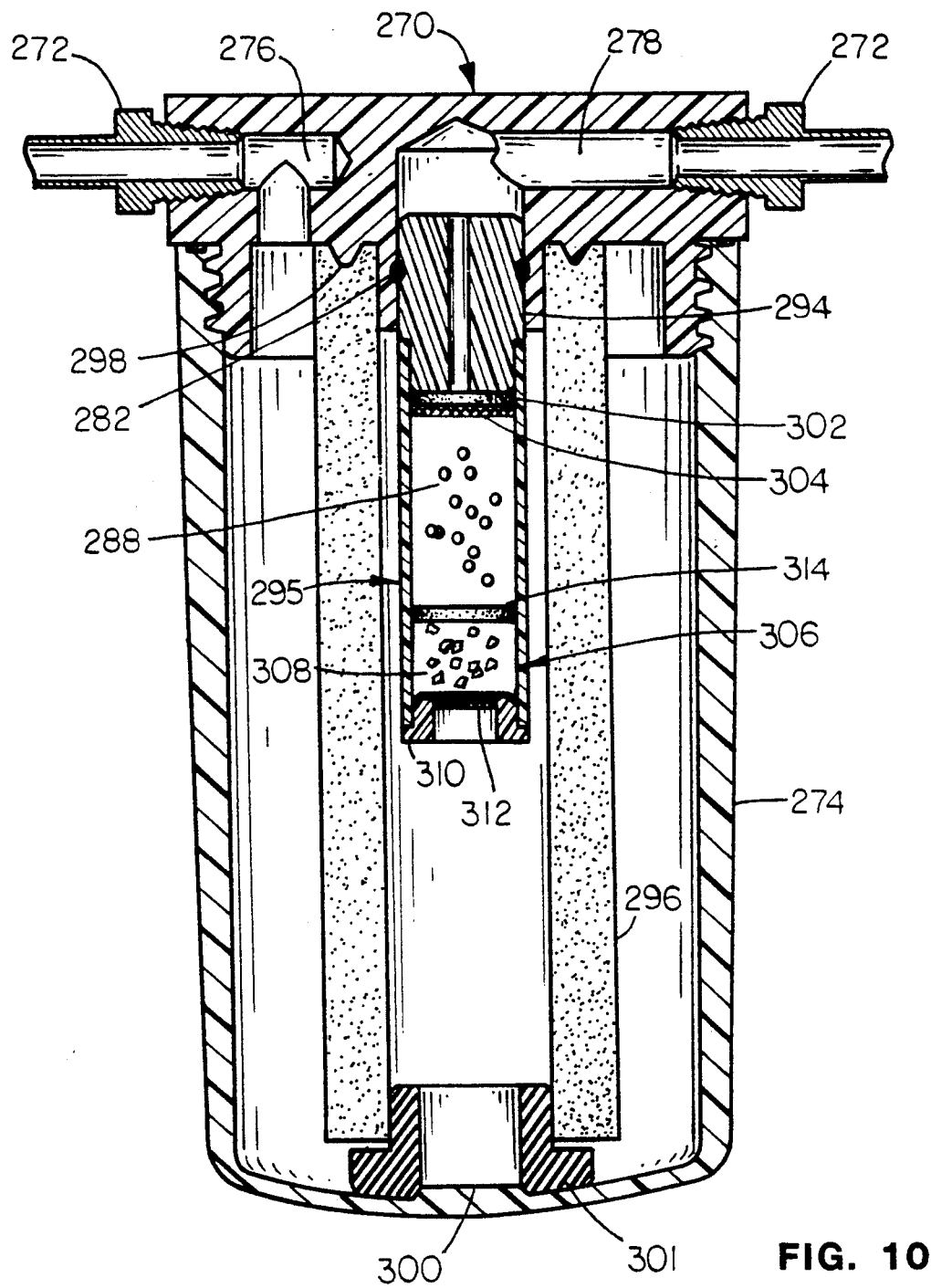
FIG. 10 shows an alternative configuration of a manifold mounted purifier supported in concentric relation to a housing supported filter.

FIGS. 9 and 10 lastly disclose assemblies compatible with household filtration systems. Such filtration systems are well known in the art and consequently will not be discussed in detail. With reference to FIG. 9, however, most such systems provide a rigid manifold 270 which is threadably mounted to the home water supply piping 272. A threaded annular portion 273 receives a suspended housing 274. Water is directed from an inlet port 276, through the housing 274 and to an outlet port 278.

In distinction to presently available manifolds, the manifold of FIG. 9 has been modified to include an annular collar 280 which extends from the lower surface of the manifold 270 in alignment with a formed channelway 281 that communicates with the outlet port 278. Supported from the collar 280 and contained thereto via an O'ring seal 282 and snap ring 284 is a purification cartridge 285. The cartridge 285 is similar to the cartridge 238 shown in FIG. 7. That is, the cartridge 285 supports a distal, foam pre-filter 286 and screen 244. Proximal thereto and substantially filling the cartridge is a bed 288 of a pentacide bactericide. A foam post-filter 290 and screen 292, in turn, mount distal to an end coupler 294 which supports the O'ring seal 282 and snap ring 284. The cartridge 285 is thus removably suspended with the housing 274 to purify the household water. The cartridge 285 may be periodically changed as the useful life of the cartridge expires.

Referring to FIG. 10, yet another household system is shown which is constructionally similar to that of FIG. 9. That is, a modified, annular recess containing manifold 270 is provided which supports a purification cartridge 295 thereto.

Surrounding the cartridge 295 and extending the length of the housing is an annular filter 296. The filter 296 is typically constructed from a relatively rigid porous material such as open celled foams, plastics or the like. The wall thickness of the filter 296 is sized to accommodate the space between the cartridge 295 and housing sidewalls and mounts in indexed relation to the housing via a V-shaped annulus 298 which projects from the manifold bottom and a cylindrical index member 300 which projects from the bottom of the housing 274 to mount in a porous end plug 301. The filter 296 is thus supported at its upper and lower ends in concentric relation to the cartridge 295.

The cartridge 295 otherwise supports a suitable bactercide bed 288 of pentacide or triocide between a post filter 302, screen 304 and a pre-filter 306. The pre-filter 306 may comprise a bed of GAC material or other porous semi rigid material. As depicted, a GAC bed 308 is used which is supported between a slip-on end cap 310 having a screen mesh bore of 312 which opens to the bore of the cartridge 295. A foam spacer 314 separates the GAC media 308 from the bactericide bed 288.

While the invention has been described with respect to a number of presently considered embodiments, modifications and improvements thereto, it is to be appreciated that a variety of other modifications might be made thereto. The invention should accordingly be interpreted within the scope of the following claims and should not be strictly construed in relation to the foregoing description.

What is claimed is:

1. Liquid purification apparatus comprising:
   (a) a tubular housing having a through bore and including first and second portions, said first portion including an inlet port to the bore and said second portion including an outlet port from the bore, and coupling means for securing said first and second portions to one another with the inlet and outlet ports at opposite ends of the housing;
   (b) a flexible tube coupled to said inlet port and having a filter mounted over a through bore;
   (c) filtration means contained in said first portion for filtering suspended particulates from liquid passing therethrough;
   (d) bactericide means contained within said first and second portions for devitalizing contaminants from liquid passing therethrough; and
   (e) means for separating and isolating said bactericide means and filtration means from one another and said inlet and outlet ports.

2. Apparatus as set forth in claim 1 wherein said first and second housing portions each include a surface which is shaped to interconnect and restrain one to the other end-to-end.

3. Apparatus as set forth in claim 2, wherein said first and second housing portions include concentrically aligning surfaces which slip couple to one another and wherein one of the surfaces includes a slot and the other surface includes at least one radially extending projection which aligns with the slot and further including means for forming a liquid tight seal at the juncture between the first and second housing portions upon securing one to the other.

4. Apparatus as set forth in claim 3 wherein the slot includes a radially offset portion whereat the projection mounts upon rotating said first and second housing portions relative to one another.

5. Apparatus as set forth in claim 2 wherein each of the first and second housing portions includes a threaded surface.

6. Apparatus as set forth in claim 2 including a resilient annular clip which mates with aligning annular recesses formed in surfaces of said first and second housing portions.

7. Apparatus as set forth in claim 1 including means for forming a liquid tight seal at a juncture between said first and second housing portions.

8. Apparatus as set forth in claim 1 wherein the filter secured to said flexible tube includes a rigid portion having a plurality of through apertures and means for supporting a porous foam member thereto.

9. Apparatus as set forth in claim 1 wherein the filter secured to said flexible member includes an expansible meshwork which meshwork radially projects from said filter.

10. Apparatus as set forth in claim 1 including a removable mouthpiece mounted to said outlet port.

11. Apparatus as set forth in claim 1 including a flexible tube coupled to said outlet port.

12. Apparatus as set forth in claim 1 including a mouthpiece having a surface shaped to interconnect with a mating surface of said second housing portion adjacent said outlet port.

13. Apparatus as set forth in claim 1 wherein (1) said first housing portion contains a penta-valent iodine bactericide proximal to the inlet port and a granular activated carbon and (2) said second housing contains in seriatim order, a penta-valent iodine bactericide adjacent the juncture between said first and second housing portions, a granular activated carbon and a tri-valent iodine bactericide.

14. Apparatus as set forth in claim 1 wherein said first housing portion is substantially filled with a granular activated carbon and said second housing portion is substantially filled with a granular activated carbon and a penta-valent iodine bactericide.

15. Liquid purification apparatus comprising:
 (a) a container having an open end and whereto a watertight cover is removably secured, said cover including vent means and an outlet aperture;
 (b) cartridge means mounted within said container for filtering and purifying liquids passing therethrough and including,
   1) filter means secured to an inlet port of a tubular cartridge housing,
   2) bactericide means contained within the cartridge housing proximal said filter means,
   3) granular active carbon filtration means contained within the cartridge housing,
   4) means for separating the filtration and bactericide means from one another and the inlet port and an outlet port of the cartridge housing, and
   5) means for coupling the outlet port of the cartridge housing to the container in communication with the outlet aperture; and
 (c) wherein the container walls are resiliently flexible and whereby the container can be pressurized upon flexing the container walls.

16. Apparatus as set forth in claim 15 including meshwork means radially extending in said container for stabilizing the cartridge means against lateral movement.

17. Apparatus as set forth in claim 16 wherein said cover includes an annular recess aligned with an outlet bore, which recess receives the outlet port of said cartridge means, and further including O'ring seal means and resilient retainer clip means which cooperating with adjoining surfaces of said annular recess and cartridge means for restraining said cartridge means in liquid tight engagement to said cover.

18. Apparatus as set forth in claim 17 wherein said container includes means projecting from an interior surface for coupling to said cartridge housing and supporting said cartridge housing in aligned relation to said container.

19. Apparatus as set forth in claim 15 including first and second tubular members coupled to said cartridge means, wherein said first tubular member is coupled between a filter and the inlet port and said second tubular member is secured to the outlet port and passes through the outlet aperture.

20. Apparatus as set forth in claim 15 wherein the outlet aperture includes nozzle means for sealing the outlet aperture in a first position and exposing the outlet aperture to express liquid at a second position.

21. Apparatus as set forth in claim 15 wherein said filter means is coupled to a tubular member which extends from said inlet port and said cartridge housing includes a surface which interconnects with a projecting surface of said recess to restrain one to the other and further including means for sealing the juncture between said cartridge housing and recess.

22. Apparatus as set forth in claim 15 wherein said cartridge housing includes in seriatim relation:
 (a) a penta-valent iodine bactericide proximal said filter means;
 (b) a granular activated carbon;
 (c) a tri-valent bactericide; and
 (d) porous means for passing liquid and separating each of the said penta-valent and tri-valent bactericides and granular activated carbon from one another and said inlet and outlet ports.

23. Liquid purification apparatus comprising:
 (a) a first housing having an open end and means for securing and sealing the open end to a manifold, said manifold including inlet and outlet ports which communicate with the interior of the first housing and further including a projection having a bore aligned with the outlet port;
 (b) cartridge means for filtering and purifying liquids passing through said first housing and having a second housing including an inlet and an outlet port, wherein said second housing includes a surface adjacent the outlet port shaped to interconnect with a surface of said projection and restrain said second housing to said projection, and wherein said second housing contains, a bactericide, granular activated carbon and porous means for passing liquid and separating said bactericide and granular activated carbon from the inlet and outlet ports.

24. Apparatus as set forth in claim 23 including a filter having a bore, wherein said second housing extends in the bore of said filter, and wherein the filter extends between said manifold and a bottom surface of said first housing.

25. Liquid purification apparatus comprising:
 (a) a housing having a through bore and including first and second portions, wherein said first portion includes an inlet port to the bore and said second portion includes an outlet port from the bore, and wherein the first and second portions include surfaces having threads which threaded surfaces interconnect to restrain the first and second portions to one another with the inlet and outlet ports at opposite ends of the housing;
 (b) filtration means mounted to said first portion for filtering suspended particulates from liquid passing therethrough;
 (c) bactericide means contained within said first and second portions for devitalizing contaminants from liquid passing therethrough; and
 (d) porous means contained in said first and second housing portions for passing liquid and for isolating said bactericide means and filtration means from one another and said inlet and outlet ports.

26. Apparatus as set forth in claim 25 wherein said first portion includes a penta-valent iodine bactericide proximal of the inlet port and a granular activated carbon and said second housing includes a penta-valent iodine bactericide adjacent the juncture of said first and second housing portions, a granular activated carbon and a tri-valent iodine bactericide.

27. Apparatus as set forth in claim 25 wherein said first housing portion is substantially filled with a granular activated carbon and said second housing portion includes a penta-valent iodine bactericide.

28. Liquid purification apparatus comprising:
 (a) a housing having a through bore and including first and second portions, wherein said first portion includes an inlet port to the bore and said second portion includes an outlet port from the bore, wherein said first and second portions include concentrically aligning surfaces which couple to one another, and wherein one of the surfaces includes a slot and the other surface includes at least one radially extending projection which aligns with the slot and further including means for forming a liquid tight seal at the juncture between the first and second portions upon securing one to the other;

(b) filtration means mounted to said first portion for filtering suspended particulates;

(c) bactericide means contained within said first and second portions for devitalizing contaminants from liquid passing therethrough; and (d) porous means contained in said first and second housing portions for passing liquid and for isolating said bactericide means and filtration means from one another and said inlet and outlet ports.

29. Liquid purification apparatus comprising:

(a) a housing having a through bore and including first and second portions, wherein said first portion includes an inlet port to the bore and said second portion includes an outlet port from the bore, an wherein said first and second portions include surfaces which are shaped to cooperatively interconnect and restrain the first and second portions to one another with the inlet and outlet ports at opposite ends of the housing;

(b) filtration means mounted to said first portion for filtering suspended particulates from liquid passing therethrough;

(c) bactericide means contained within said first and second portions for devitalizing contaminants from liquid passing therethrough; and (d) porous means contained within said first and second portions for passing liquid and for isolating said bactericide means and filtration means from one another and said inlet and outlet ports.

* * * * *